United States Patent [19]
Korpi

[11] Patent Number: 5,387,047
[45] Date of Patent: Feb. 7, 1995

[54] DOUBLE ECCENTRIC FASTENER DEVICE

[75] Inventor: John G. Korpi, Livonia, Mich.

[73] Assignee: The United States of America as represented by The Secretary of the Army, Washington, D.C.

[21] Appl. No.: 127,902

[22] Filed: Sep. 23, 1993

[51] Int. Cl.$^6$ .............................................. B60D 1/00
[52] U.S. Cl. .......................................... 403/4; 403/3; 403/343; 403/DIG. 8
[58] Field of Search ............... 403/3, 4, 11, 342, 343, 403/DIG. 8; 280/506

[56] References Cited

U.S. PATENT DOCUMENTS

| | | | |
|---|---|---|---|
| 833,007 | 10/1906 | Slick | 403/DIG. 8 X |
| 1,097,185 | 5/1914 | Oehrle | 403/DIG. 8 X |
| 3,385,624 | 5/1968 | Baclini | 403/4 X |
| 4,444,294 | 4/1984 | Yoshigai | 403/4 X |
| 4,446,753 | 8/1984 | Nagano | 403/4 X |

Primary Examiner—Randolph A. Reese
Assistant Examiner—Anthony Knight
Attorney, Agent, or Firm—Peter A. Taucher; David L. Kuhn

[57] ABSTRACT

A double eccentric fastening mechanism releasably mounts brackets to a military vehicles or other objects where mounting locations on individual vehicles vary in positional relation to one another. The fastening mechanism has a first eccentric member comprising a first collar whose stepped outer diametrical surface closely fits in a complimentary stepped bore in the bracket. The first eccentric member also has a second collar fixed to and eccentric with respect to the first collar. A second eccentric member has a circular portion and a flange affixed concentrically to the circular portion. The circular portion and flange closely fit in the second collar. A socket on the second eccentric member is eccentric relative to the circular member and accepts a fastener, such as a bolt, that attaches a towing lug to the socket. The double eccentric mechanism also includes a plate that faces against the first and second eccentric members so as to inhibit rotation of the eccentric members relative to the bracket.

9 Claims, 2 Drawing Sheets

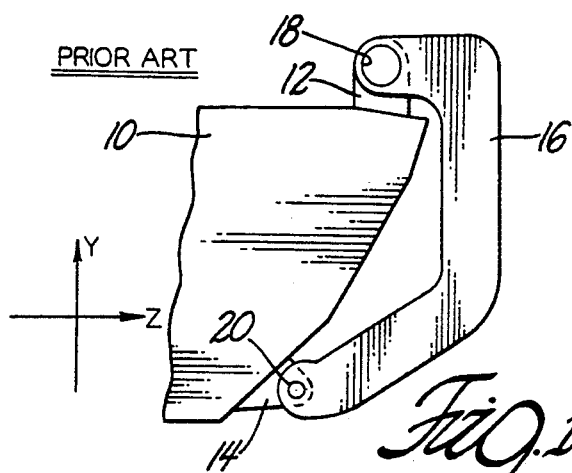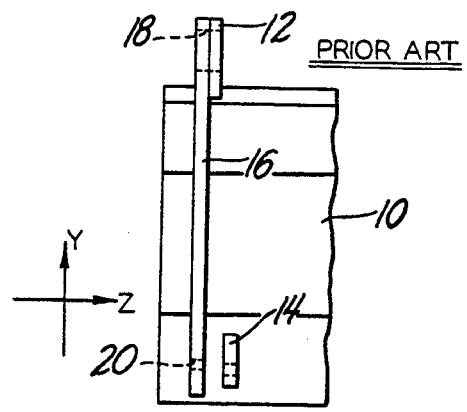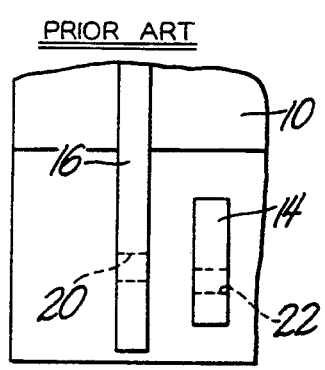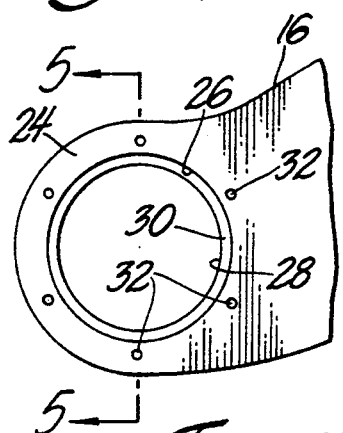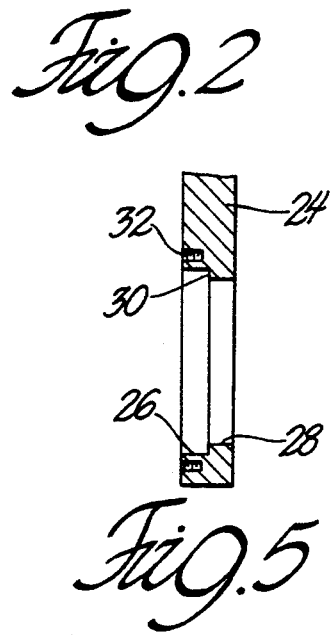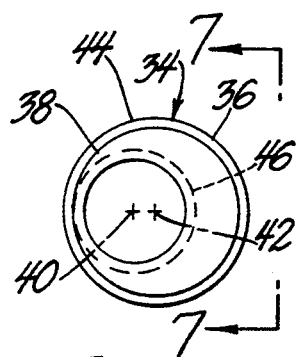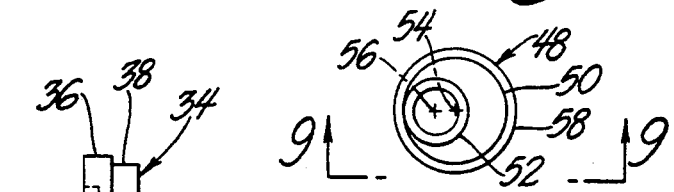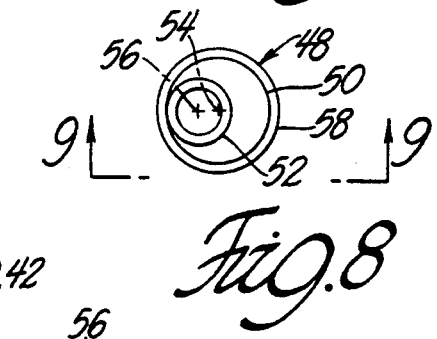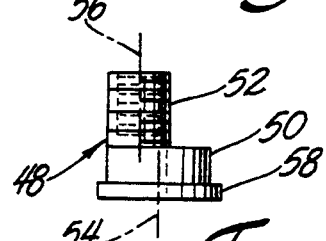

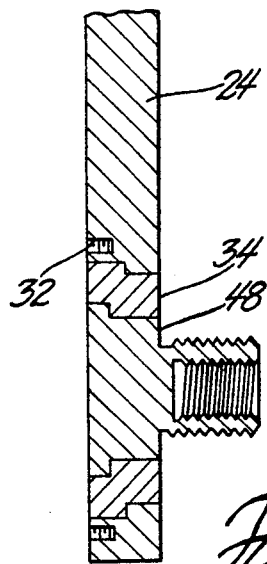
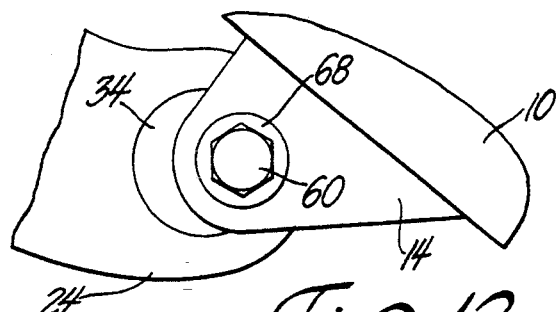
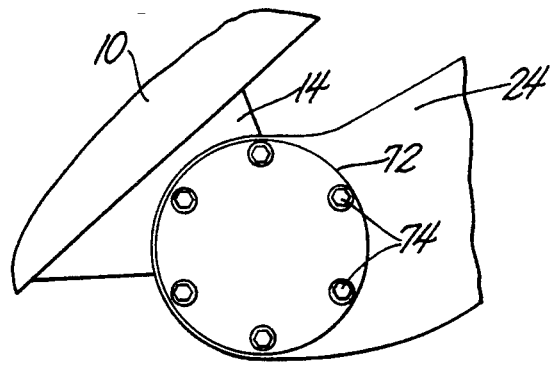
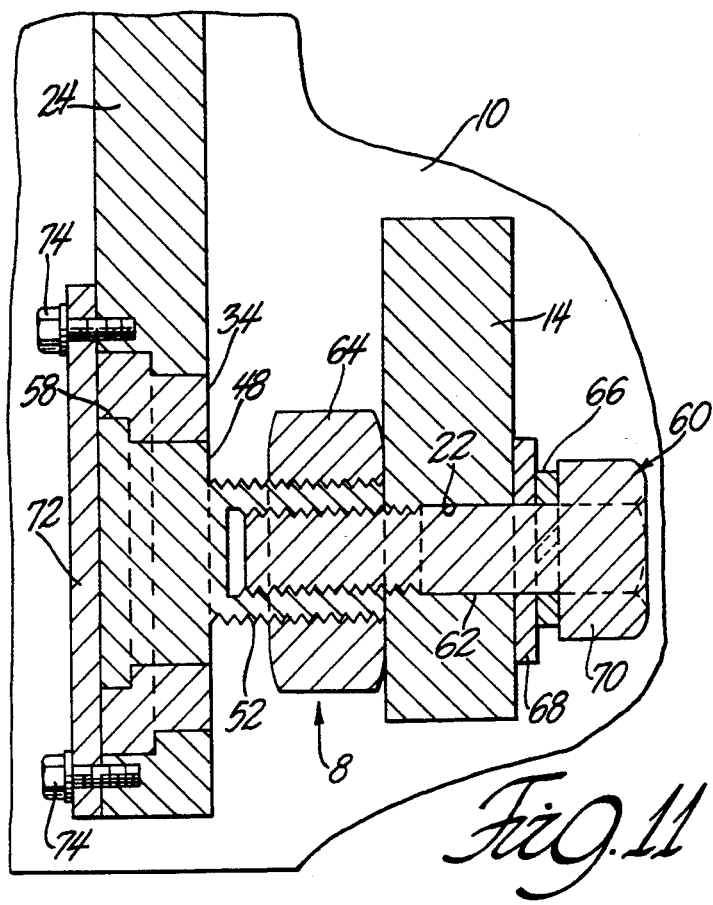

DOUBLE ECCENTRIC FASTENER DEVICE

GOVERNMENT USE

The invention described herein may be manufactured, used and licensed by or for the U.S. Government for governmental purposes without payment to me of any royalty thereon.

BACKGROUND

To discuss the background of my invention, I refer to FIG. 1, which shows one end of the hull of a conventional military vehicle 10, which can be, for example, an M1A1 Abrams main battle tank. Fixed atop hull 10 is a lifting eye 12 and fixed to a lower portion of the hull is a towing lug 14. It is desired to temporarily but securely fasten a mounting bracket 16 between eye 12 and lug 14 by bolts or other conventional fasteners. A piece of equipment can be attached to bracket 16, whereby the piece of equipment is easily installed on hull 10 and easily removed after use. Bracket 16, as shown in FIGS. 1 and 3, is not necessarily conventional, but it is not of my design.

As perhaps best understood with reference to FIGS. 1, 2 and 3, the distances between eye 12 and lug 14 in the x, y, and z directions of a Cartesian coordinate system vary greatly from one vehicle to the next, even if the vehicle involved are the same type. Consequently, it almost always happens that either upper bracket hole 18 is misaligned with eye 12 or lower bracket hole 20 is misaligned with hole 22 of lug 14.

SUMMARY OF THE INVENTION

My double eccentric fastener device solves the foregoing problem by making the location of a bracket hole adjustable in the x, y and z directions so that a standard bracket, or else a bracket as at 16, can be fit to any vehicle despite variations in the juxtaposition of eye 12 and lug 14 from one vehicle to the next. The fastening device has a first eccentric member wherein a first collar has a stepped outer diametrical surface closely received in a complimentary bore in the bracket, and a second collar is fixed eccentrically to the first collar. A second eccentric member has a circular portion and a flange affixed concentrically thereto, the circular portion and flange closely fitting with the second collar. A socket on the second eccentric member is eccentric relative to the circular member and accepts a bolt or like fastener that attaches the bracket to the socket. Fixed to the bracket is a plate that faces against both eccentric members so as to inhibit rotation of the eccentric members relative to the bracket.

BRIEF DESCRIPTION OF THE DRAWINGS

FIG. 1 is a side elevational view of a bracket aligned with the lifting eye and towing lug of military vehicle.

FIG. 2 is and end view of the bracket, eye, and lug shown in FIG. 1.

FIG. 3 is an enlarged view of the lug and a portion of the bracket shown in FIG. 2.

FIG. 4 is a side elevational view of one end of the bracket as I modify it to define a stepped through bore.

FIG. 5 is a view along line 5—5 in FIG. 4.

FIG. 6 is a side elevational view of a first eccentric member of my double eccentric fastening device.

FIG. 7 is a view taken along line 7—7 in FIG. 6.

FIG. 8 is a side elevational view of a second eccentric member of my double eccentric fastening device.

FIG. 9 is a view taken along line 9—9 in FIG. 8.

FIG. 10 is a sectional view of a subassembly comprised of the eccentric members with the bracket.

FIG. 11 is a sectional view of the complete assembly of my double eccentric fastening device.

FIG. 12 is a view of the fastening device as it would be seen from the right in FIG. 11, hidden lines being omitted.

FIG. 13 is a view of the fastening device as it would be seen from the left in FIG. 11, hidden lines being omitted.

FIG. 14 shows optional modifications that can be made to the FIG. 11 structure.

DETAILED DESCRIPTION

FIGS. 4 and 5 show the first element of my invention, which is a modified lower end 24 of bracket 16, end 24 being disposed at lug 14 when the bracket is installed on hull 10. End 24 has a straight, stepped through bore comprised of a smooth larger diameter portion 26, a smooth smaller diameter portion 28 and a flat, smooth shoulder 30 therebetween. Spaced at equal angular intervals about larger diameter portion 26 are blind threaded apertures 32 adapted to accommodate a bolt or like fastener.

Shown in FIGS. 6 and 7 is a first, outer, eccentric fitting 34 having a larger diameter collar 36 integral with a smaller diameter collar 38, the center 40 of the larger diameter collar being offset from the center 42 of the smaller diameter collar. The outer diametric surface 44 of larger diameter collar 36 fits rotatably and congruently in larger diameter portion 26 of the stepped bore in bracket end 24. Likewise, the outer diametric surface 46 of smaller diameter collar 38 fits rotatably and congruently in smaller diameter portion 28 of that stepped bore.

FIGS. 8 and 9 show a second eccentric fitting 48 whose solid, flat cylinder 50 integrally joins a doubly threaded socket 52 having threads both on its inner diametric surface and its outer diametric surface. The center 54 of the flat cylinder is offset from the center 56 of the socket and an annular flange 58 is integral with cylinder 50 and is concentric therewith. Cylinder 50 is closely receivable in smaller diameter collar 38 of first eccentric fitting 34, and annular flange 58 is closely receivable in larger diameter collar 36. Second eccentric fitting 48 is shown assembled together with first eccentric fitting 34 and bracket end 24 in FIG. 10.

The complete assembly of my double eccentric fastener device 8, which fixes bracket end 24 to towing lug 14, is shown in FIG. 11. Bolt 60 passes through lug 14 and threadingly engages socket 52, bolt 60 having a smooth shank portion 62 closely and smoothly fit in hole 22. A nut 64 threadingly engaged onto the exterior of socket 52 is tightened against lug 14 so that second eccentric fitting 48 is inhibited from rotating relative to lug 14. A lock washer 66 and a spacing washer 68 are disposed on shank portion 62 between bolt head 70 and lug 14, and optionally, a similar lock washer and spacing washer can be located between nut 64 and lug 14.

Circular cover plate 72 affixes to end 24 over and against fittings 34 and 48 by any conventional fasteners such as bolts 74, whereby the subassembly comprised of end 24, fitting 34 and fitting 48 is held closely together. Optionally, fittings 34 and 48 will interferingly engage plate 72 so as to be prevented from rotating relative to end 24.

FIG. 14 shows possible modifications to the double eccentric fastener device wherein first eccentric fitting 76 replaces first eccentric fitting 34 and second eccentric fitting 78 replaces second eccentric fitting 48. It will be understood that fittings 76 and 78 are bilaterally symetric with respect to axis 96. In this figure, lower bracket end 24 defines a stepped tapered bore having a larger diameter portion 82 and a smaller diameter portion 80. Fitting closely and possibly interferingly within the stepped tapered bore is first eccentric fitting 76, which is configured as a hollowed stepped fustrum having a larger inner diametrical section 84 and an adjoined smaller inner diametrical section that is radially offset from diametrical section 84. Received closely and possibly interferingly within first eccentric fitting 76 is second eccentric fitting 78, which comprises fustrum 88 having bevelled flange 90 concentric therewith. Integral with fustrum 88 and eccentric thereto is double threaded socket 92, which is the same as double threaded socket 52 of FIGS. 8 and 9.

Between cover plate 72 and bracket end 24 is mediate plate 94 of softer material than the cover plate or the bracket end, mediate plate 94 being made of a metal such as brass, for example. It is desired that the surfaces of fittings 76 and 78 which contact plate 94 be roughened and that plate 94 be pressed firmly axially against these fitting surfaces by plate 72, so that plate 94 deformingly conforms to these fitting surfaces. By this construction, plate 94 provides a shear resistance to rotation of the fittings relative to bracket end 24. Also, the pressing of plates 72 and 94 will keep fitting 78 interferingly engaged with fitting 76 and will keep fitting 76 interferingly engaged with bracket end 24, whereby relative movement among the plates and bracket end is further inhibited. It may in some cases be desired to still further inhibit the aforementioned relative motion by providing roughened surfaces where fitting 78 contacts fitting 76 and where fitting 76 contacts bracket end 24. The pressing action of plates 72 and 94 combined together with the roughened surfaces will fix the fittings and bracket end relative to one another.

I do not desire to be limited to the exact details of structure or method shown herein since obvious modifications will occur to those skilled in the relevant arts without departing from the spirit and scope of the following claims.

I claim:

1. A fastening mechanism for releasably mounting one device to another device where mounting locations on the other device vary in positional relation to one another, the fastening mechanism comprising:
    a first and a second mounting location on the other device;
    means at the first mounting location for connecting the one device to the other device;
    a first eccentric member having a stepped outer diametrical surface;
    a first collar on the first eccentric member;
    connective means fixed to the one device at the second mounting location for engaging the first eccentric member, the connective means defining a stepped bore closely and concentrically receiving the stepped outer diametrical surface of the first eccentric member;
    a second collar on the first eccentric member fixed to and eccentric with respect to the first collar, the first and second collars defining the stepped outer diametrical surface;
    a second eccentric member having a circular portion;
    a flange affixed concentrically to the circular portion, the circular portion and flange closely fit in the second collar of the first eccentric member;
    a socket on the second eccentric member eccentric relative to the circular portion;
    fastener means for attaching the other device to the socket.

2. The mechanism of claim 1 further comprising inhibitor means for inhibiting rotation of the eccentric members relative to the connective means, the inhibitor means comprising a plate that faces against the first eccentric member and the second eccentric member.

3. The mechanism of claim 1 wherein the fastener means comprises:
    a head;
    a shank extending from the head;
    a first portion of the shank closely and smoothly fitting within a bore formed in the other device at the second mounting location;
    a second portion of the shank protruded from the second mounting location into engagement with the socket.

4. The mechanism of claim 3 further including anti-movement means for fixing the location of the socket relative to the second mounting location the anti-movement means comprising:
    external threads on the socket;
    an internally threaded member engaged with the external threads;
    a face of the internally threaded member opposed to the second mounting location and pressable thereagainst.

5. The mechanism of claim 4 wherein the engagement of the shank with the socket comprises:
    internal threads in the socket;
    threads on the second portion of the shank mated with the internal threads.

6. The mechanism of claim 1 further comprising inhibitor means for inhibiting rotation of the eccentric members relative to the connective means, the inhibitor means comprising:
    a cover plate fixed relative to the connective means and facing towards the first eccentric member and the second eccentric member;
    a mediate plate of softer material than the cover plate and fixed relative thereto;
    the eccentric members having roughened surfaces for pressing against and deforming a contact surface of the mediate plate.

7. The mechanism of claim 1 further comprising:
    a roughened interface between the connective means and the first eccentric member;
    a roughened interface between the first eccentric member and the second eccentric member;
    means for exerting pressure on the roughened interfaces, whereby the eccentric members are held fast relative to the connective means.

8. A fastening mechanism for releasably mounting one device to another device where mounting locations on the other device vary in positional relation to one another, the fastening mechanism comprising:
    a first and a second mounting location on the other device;

a bracket extending from the first mounting location to the second mounting location;

means at the first mounting location for connecting the bracket to the other device;

a first eccentric member having a stepped outer diametrical surface;

a first collar on the first eccentric member;

the bracket defining a stepped bore at the second mounting location closely and concentrically receiving the stepped outer diametrical surface of the first eccentric member;

a second collar on the first eccentric member fixed to and eccentric with respect to the first collar, the first and second collars defining the stepped outer diametrical surface;

a second eccentric member having a circular portion;

a flange affixed concentrically to the circular portion, the circular portion and flange closely fit in the second collar of the first eccentric member;

a socket on the second eccentric member, the socket being eccentric relative to the circular portion;

fastener means for attaching the other device to the socket;

means to squeeze together the bracket, the first eccentric member and the second eccentric member.

9. The mechanism of claim 8 further comprising:

a first roughened interface;

a second roughened interface;

wherein the first roughened interface is between the bracket and the first eccentric member, and the second roughened interface is between the first eccentric member and the second eccentric member.

* * * * *